United States Patent
Montgomery et al.

(10) Patent No.: US 6,859,256 B2
(45) Date of Patent: Feb. 22, 2005

(54) METHOD OF MAKING A PARALLAX BARRIER, PARALLAX BARRIER AND AUTOSTEREOSCOPIC DISPLAY

(75) Inventors: David James Montgomery, Oxford (GB); Marina Khazova, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 101 days.

(21) Appl. No.: 10/457,059

(22) Filed: Jun. 6, 2003

(65) Prior Publication Data

US 2003/0234980 A1 Dec. 25, 2003

(30) Foreign Application Priority Data

Jun. 11, 2002 (GB) .............................................. 0213340

(51) Int. Cl.[7] .......................... G03B 27/32; G02B 27/22
(52) U.S. Cl. ............................ 355/22; 355/77; 359/462
(58) Field of Search ..................... 355/22, 77; 359/462, 359/464, 465; 396/324; 348/51, 54

(56) References Cited

U.S. PATENT DOCUMENTS 5,264,964 A * 11/1993 Faris .......................... 359/465
6,046,849 A * 4/2000 Moseley et al. ............ 359/465
6,271,896 B2 * 8/2001 Moseley et al. .............. 349/15
6,459,532 B1 * 10/2002 Montgomery et al. ....... 359/462

FOREIGN PATENT DOCUMENTS

| EP | 1 072 924 A2 | * | 7/2000 |
| GB | 2 317 295 A | | 3/1998 |
| GB | 2 320 156 A | * | 6/1998 |
| GB | 2 352 573 A | | 1/2001 |

OTHER PUBLICATIONS

British Search Report, Application No. GB 0213340.3, dated Dec. 5, 2002.

* cited by examiner

Primary Examiner—Alan Mathews
(74) Attorney, Agent, or Firm—Renner, Otto, Boisselle & Sklar, LLP

(57) ABSTRACT

A parallax barrier is made by developing a film exposed through a mask having elongate opaque regions interleaved with transparent regions. The film is exposed by a light source through the mask while the mask is moved so as to vary the exposure of each region of the film for forming the parallax barrier slit edges. Alternatively, the film or the light source may be moved during exposure. It is thus possible to make soft edge barriers, for example for use in autostereoscopic 3D displays.

18 Claims, 15 Drawing Sheets

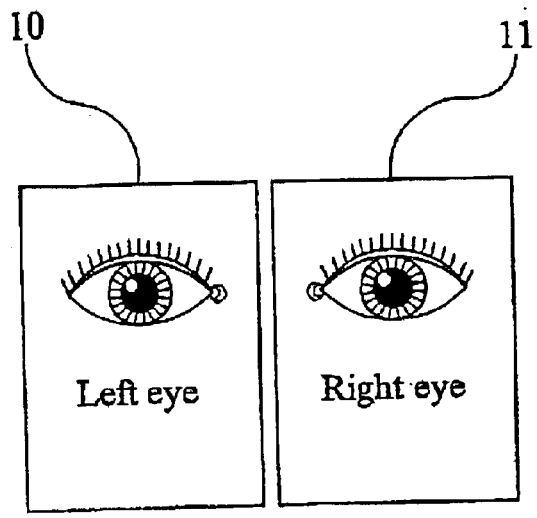
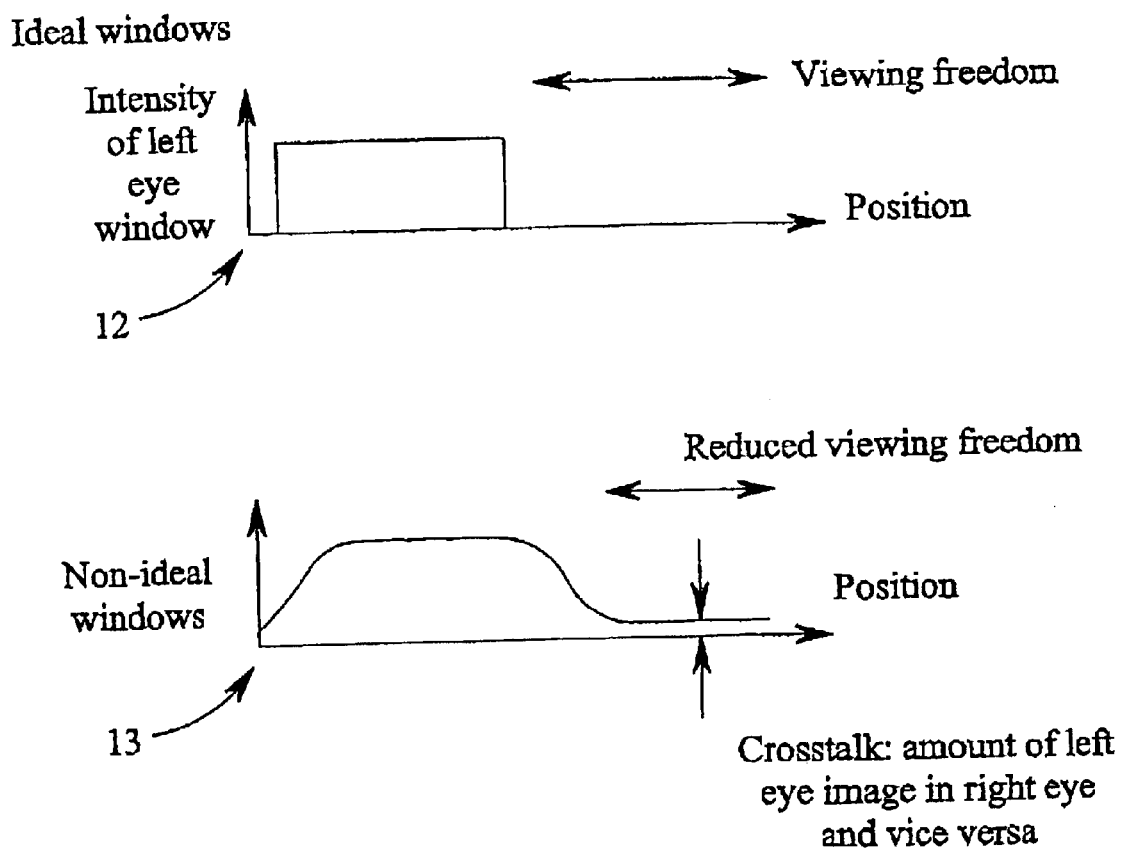
FIG 3

"Hard edge" barrier: cross talk
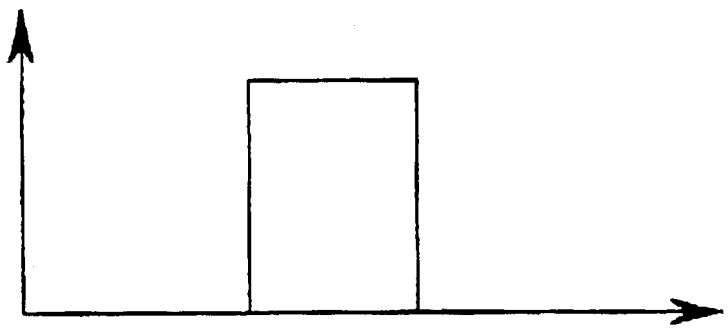
Grey-scale edge, or soft edge
"Soft edge" barrier: low cross talk
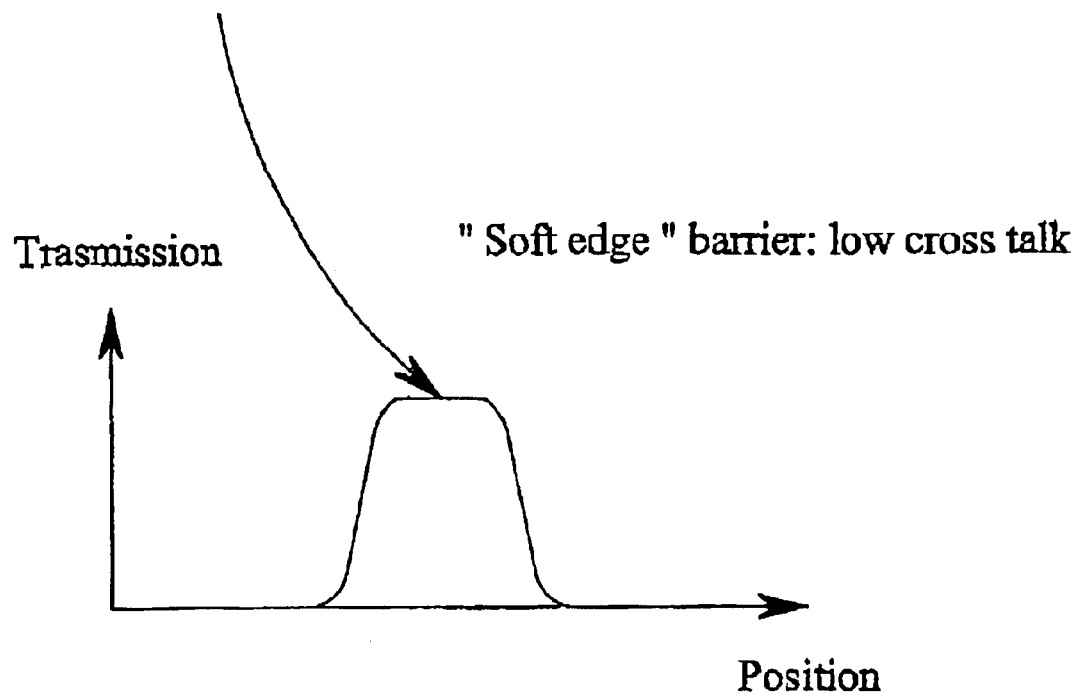
FIG 4

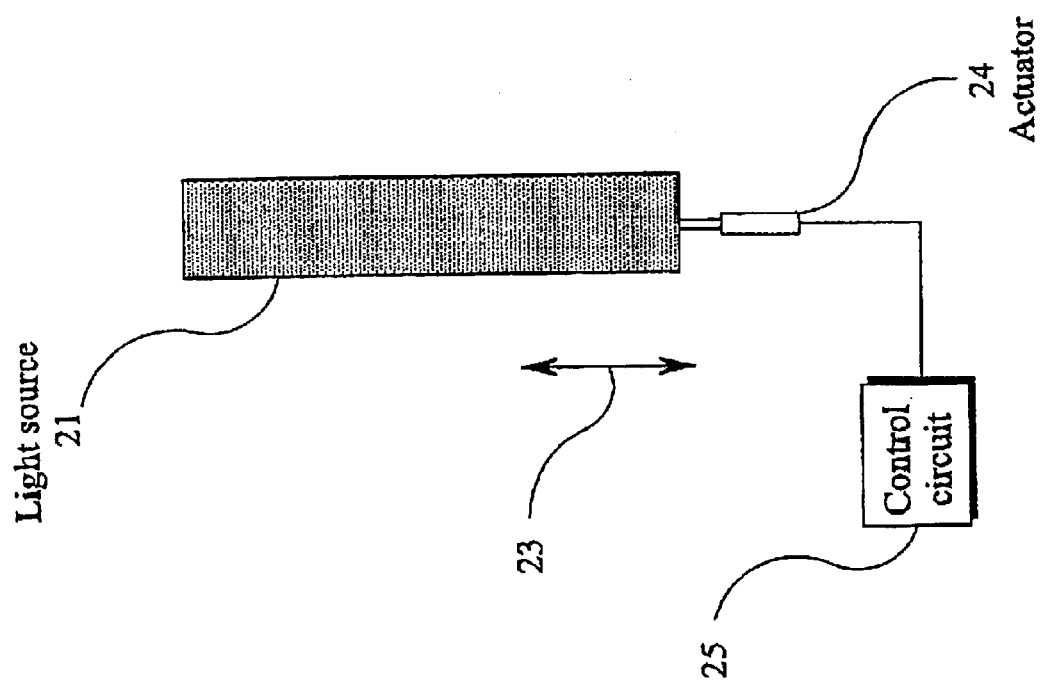
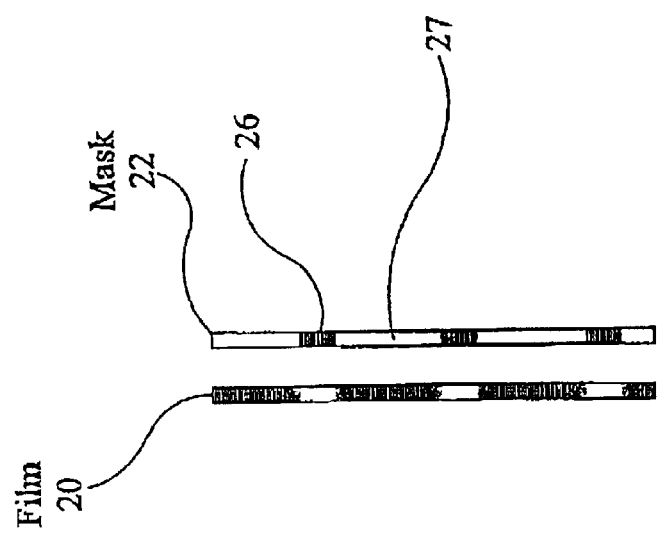
FIG. 9

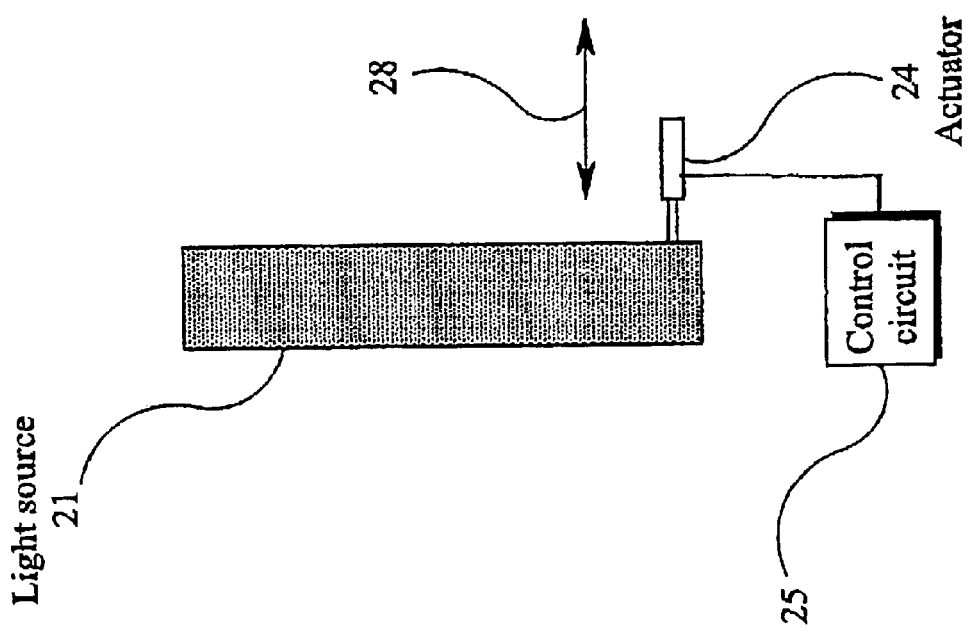
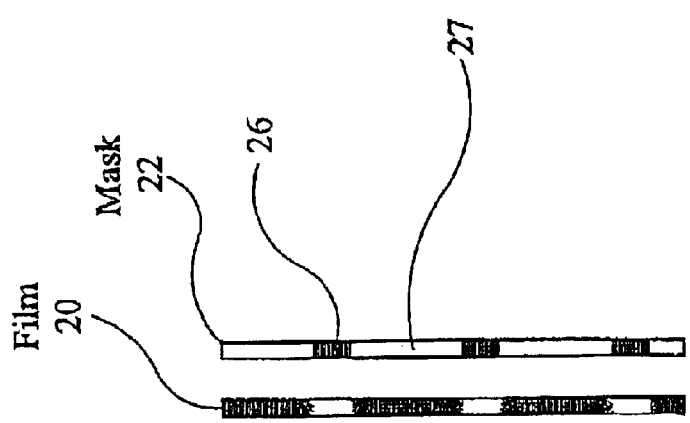
FIG. 10

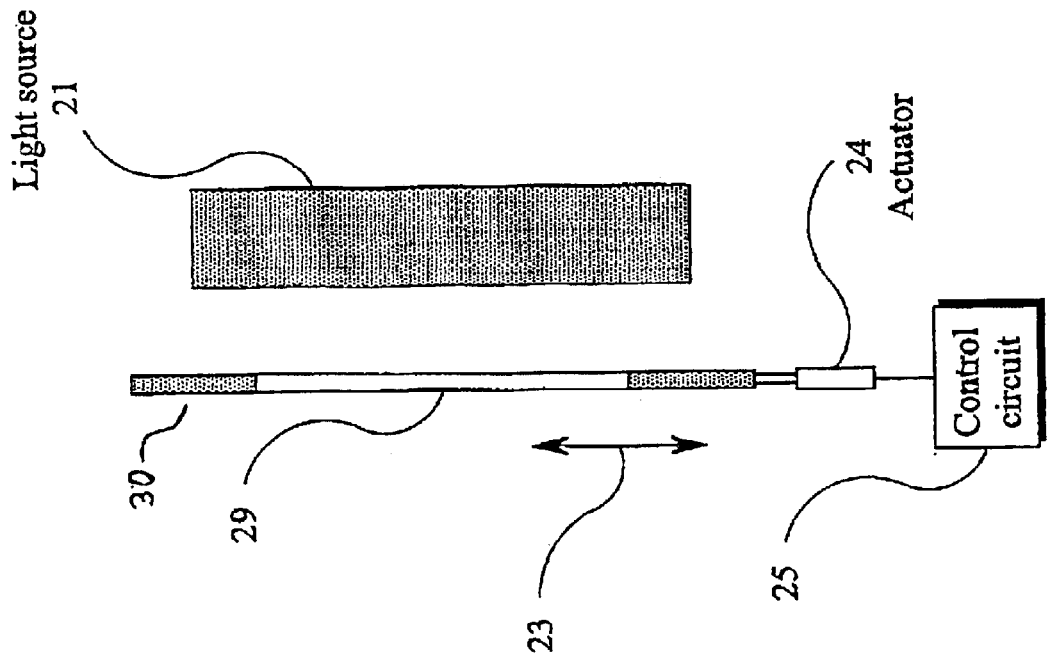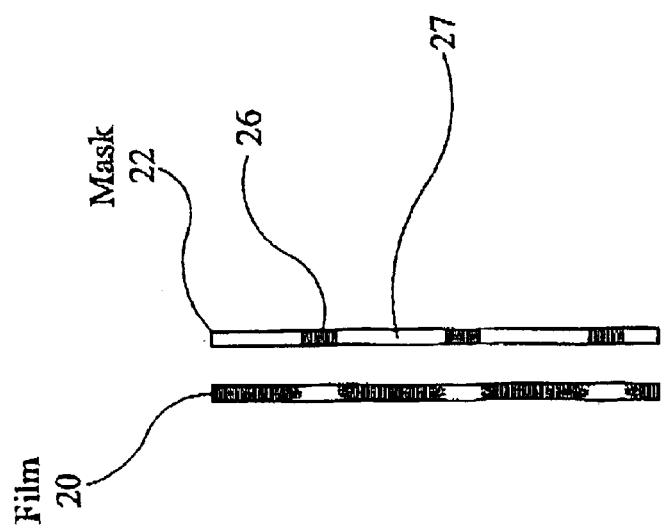
FIG 11

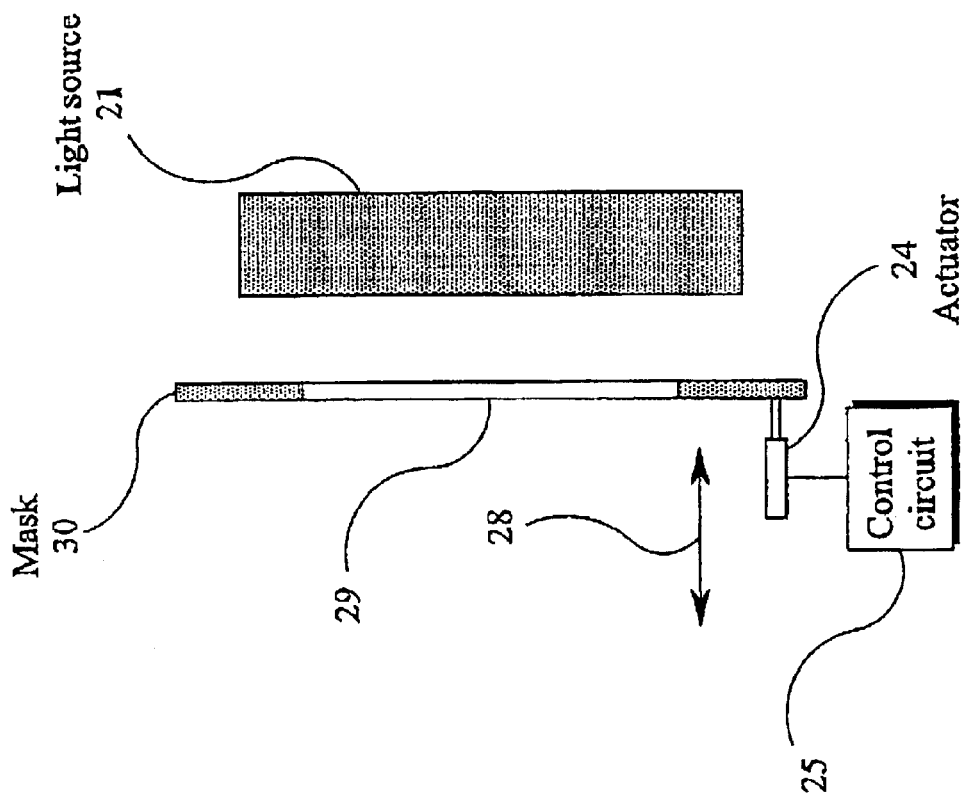
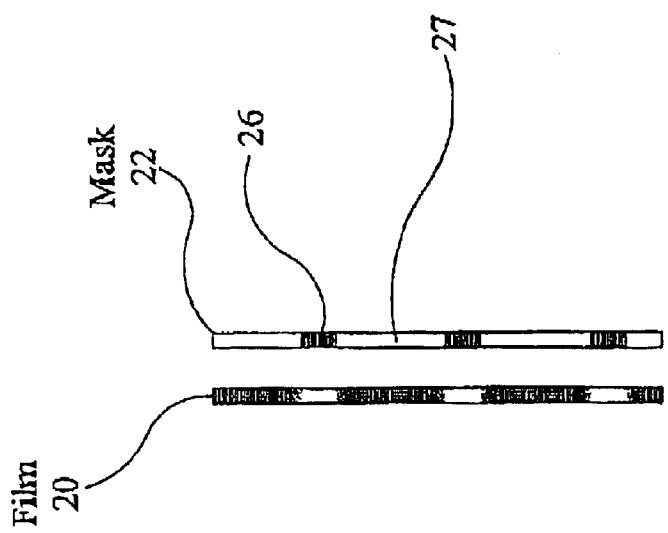
FIG 12

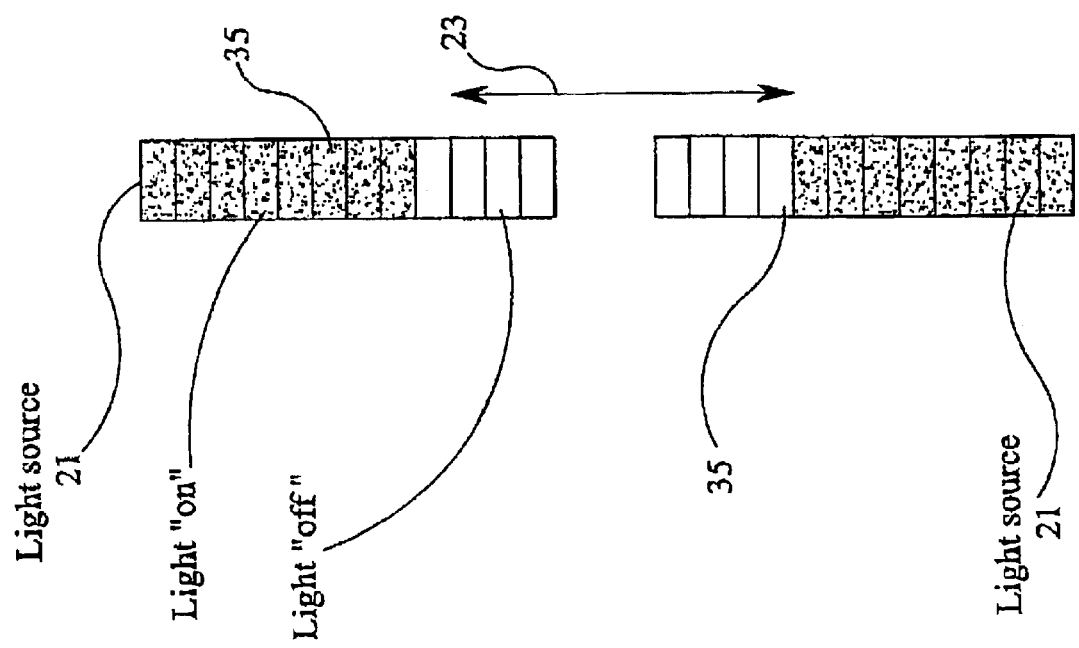
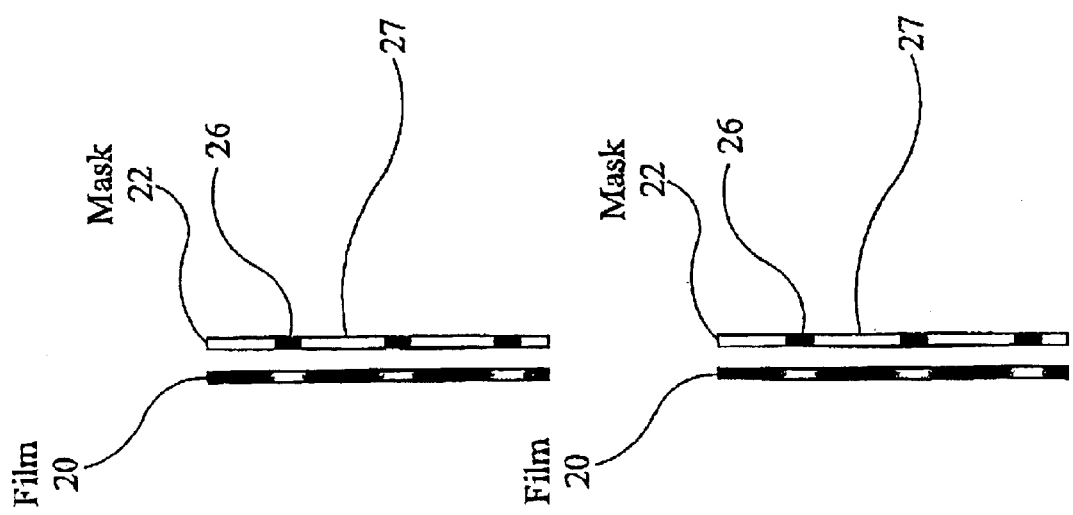
FIG 13

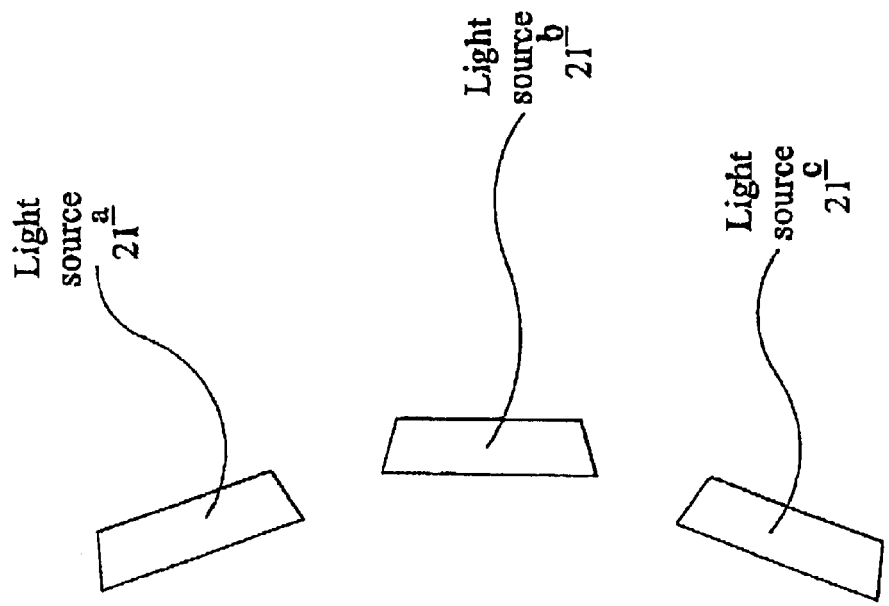
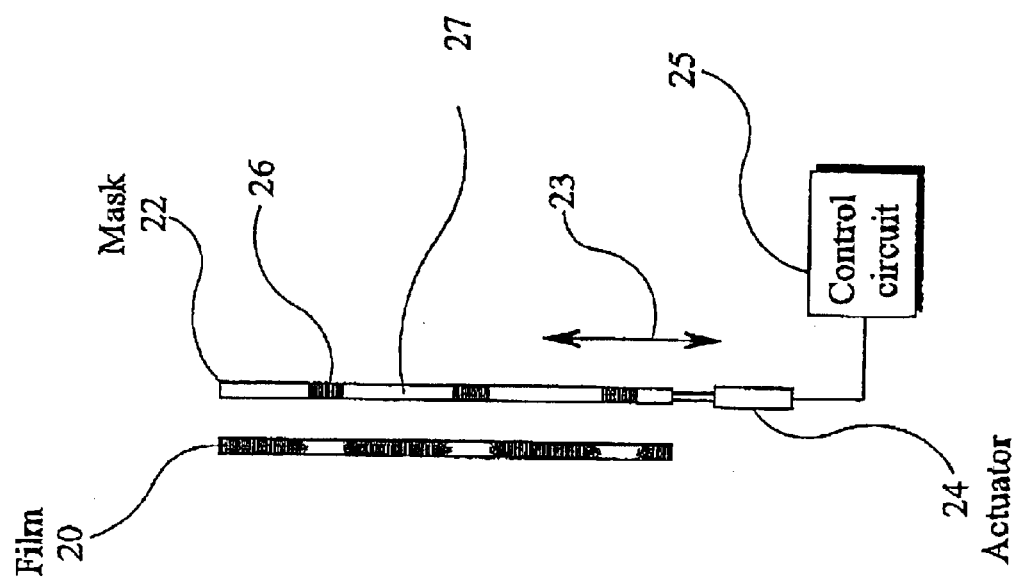
FIG 15

METHOD OF MAKING A PARALLAX BARRIER, PARALLAX BARRIER AND AUTOSTEREOSCOPIC DISPLAY

BACKGROUND OF THE INVENTION

1. Field of the Invention

The present invention relates to a method of making a parallax barrier. The present invention also relates to a parallax barrier made by such a method and an autostereoscopic three dimensional (3D) display including such a barrier. Uses of such barriers include consumer and professional photography and uses of such displays include 3D television, police identification, medical imaging, scientific visualisation, point of sale counters and 3D design.

2. Description of the Related Art

FIG. 1 of the accompanying drawings illustrates a known type of autostereoscopic 3D display of the front parallax barrier type. The display comprises a liquid crystal spatial light modulator 1 arranged to provide a plurality of picture elements (pixels) such as 2. The pixels are arranged as vertical columns and display two images as interlaced vertical strips. A parallax barrier 3 is provided on a front surface of the device 1 and is spaced from the plane containing the pixels 2. A light source (not shown) is provided behind the rear surface of the device 1 for illuminating the pixels 2.

The parallax barrier 3 restricts the visibility of the columns of pixels at a designed viewing distance in front of the display so as to form viewing windows such as 4. The horizontal pitch of the vertical slits such as 5 of the parallax barrier 3 is slightly less than twice the horizontal pitch of the pixel columns so as to provide view point correction as illustrated in FIG. 2. Within a left eye viewing "diamond" 6, the columns of pixels displaying an image for viewing by the left eye of an observer are visible whereas the other columns are not visible. Conversely, within a right eye viewing "diamond" 7, the columns of pixels displaying an image intended for viewing by a right eye of the observer are visible whereas the other columns of pixels are not visible. Thus, provided an observer observes the display with the left and right eyes located within the left and right eye viewing diamonds 6 and 7, respectively, the observer can perceive a 3D image. The viewing windows are formed at the laterally widest regions of the viewing diamonds 6 and 7 such that the observer has the greatest degree of lateral freedom of movement while seeing the 3D image when the eyes are at the viewing windows. The width of each viewing window is designed to be substantially equal to the average interocular separation so as to provide the maximum amount of lateral viewing freedom.

In a ideal display, the intensity distribution of light across each viewing window would be a "top hat function" such that, when an eye is in the window, it sees maximum light intensity which is constant across the viewing window whereas zero intensity would be seen by an eye outside the viewing window. This is illustrated in FIG. 3 of the accompanying drawings, which illustrates left and right eye viewing windows at 10 and 11, respectively, the ideal left eye intensity function with respect to lateral position at 12, and the actual "non-ideal" window function which is generally achieved at 13. As shown by the actual function 13, light intended for the left eye viewing window 10 has an intensity which varies somewhat with lateral position within the window and which does not fall abruptly to zero at the edge of the window but instead slopes down to a non-zero intensity in the region of the right eye viewing window. The non-ideal function results, for example, from diffraction in the slits of the parallax barrier. Thus, lateral viewing freedom is reduced and a small amount of light from the left eye image is visible to the right eye and vice versa resulting in crosstalk. The design of the parallax barrier slit width in such displays is a compromise between wide slits, which allow a high light throughput but give high crosstalk, and narrow slits, which give reduced crosstalk but suffer from low brightness.

EP 0 822 441 discloses a technique for reducing diffraction effects from pixel apertures in rear-illuminated autostereoscopic displays. This technique involves varying the pixel aperture function and providing grey scale modification of the edges of the parallax barrier slits.

EP 1 072 924 discloses a technique for reducing diffraction from parallax barriers in both front and rear parallax barrier displays. This technique involves forming the slits as multiple sub-apertures of varying intensity.

Montgomery et al "Analysis of the performance of a flat panel display system convertible between 2D and autostereoscopic 3D modes", Proc SPIE, vol 4297, January 2001, ISSN 0277-786X describes a theoretical model based on Fresnel diffraction theory with predictions of window shapes and crosstalks which match experimental evidence to a high degree of accuracy.

These documents describe the difference between a "hard edge" parallax barrier and a "soft edge" parallax barrier. FIG. 4 illustrates the function of transmissivity against position across a slit of hard edge and soft edge barriers. In the hard edge barrier, there is a sharp transition between the opaque area and the transparent area of the barrier whereas, in the soft edge barrier, there is a more gradual change in transmissivity between the opaque and transparent areas at the edges of the barrier slits.

EP 1 072 924 also discloses a technique for manufacturing a soft edge parallax barrier having a plurality of sub-apertures. In this technique, a hard edge mask having a plurality of slits for forming each parallax barrier slit is spaced from a photographic material. The material is then exposed to light passing through the mask from a light source, after which the material is developed to form the parallax barrier. In order for this technique to work, knowledge of the diffraction profile and control of the light source are required. Also, relatively precise knowledge of the photographic material, such as an emulsion on a substrate, and its grey scale response is required.

Other known techniques for producing hard edge parallax barriers are described in GB 1 057 105, DE 2 501 195, JP 6 301 5249, and RA Lawes "Future developments for optical mask technology", Microelectronic Engineering 23 (1–4) 1994, pp 23–9, ISSN 0167-9317.

SUMMARY OF THE INVENTION

According to a first aspect of the invention, there is provided a method of making a parallax barrier, comprising: providing a first mask having a plurality of elongate opaque regions interleaved, in a first direction perpendicular to longitudinal axes of the opaque regions, with a plurality of transparent regions; exposing a photographic material to light from a light source through the first mask while, during at least part of an exposure period, moving at least one of the first mask, the material and the light source relative to the or each other thereof so as to vary the exposure of each region of the material for forming a parallax barrier slit edge; and developing the exposed material to form the parallax barrier.

The relative movement may be in a direction parallel to the first direction.

The relative movement may be in a direction perpendicular to the first direction and to the longitudinal axes of the opaque regions.

The first mask may be moved relative to the material.

The first mask may be spaced from the material and the light source may be moved relative to the first mask.

The light source may comprise a light emitter disposed behind an aperture of a second mask. The second mask may be moved relative to the first mask.

The light source may comprise a plurality of light emitters which are switched so as to vary the direction of illumination of the material.

The light source may comprise a plurality of light sources.

The opaque regions may be substantially uniformly opaque.

The transparent regions may be substantially uniformly transparent.

The transparent regions may have edges whose transmissivity varies in the first direction.

The mask may comprise a plurality of groups, each of which comprises a plurality of the opaque or transparent regions for forming a parallax barrier slit having a plurality of sub-apertures.

The material may comprise a photographic emulsion on a substrate.

The material may be arranged to darken as a result of exposure.

The method may comprise using the parallax barrier in a copying process to make further parallax barriers.

According to a second aspect of the invention, there is provided a parallax barrier made by a method according to the first aspect of the invention.

According to a third aspect of the invention, there is provided an autostereoscopic three dimensional display comprising a parallax barrier according to the second aspect of the invention.

It is thus possible to provide a technique which does not require knowledge of the diffraction profile of the mask and in which control of the light source is not required. Also, precise knowledge of the emulsion and its grey scale response is not required. Instead, the relative movement between the various items is sufficient to allow any desired soft edge profile to be created with minimal experimentation. Single sub-aperture and multiple sub-aperture barriers can be made and, in the latter case, substantially identical or different sub-aperture edge profiles can easily be formed. The technique may be used to create a "master" parallax barrier which can then be used for mass-producing parallax barriers, for example by contact or projection copying. Soft edge parallax barriers can therefore be made accurately and cheaply.

BRIEF DESCRIPTION OF THE DRAWINGS

The invention will be further described, by way of example, with reference to the accompanying drawings, in which:

FIG. 3 illustrates viewing windows and intensity profiles for ideal and non-ideal windows;

FIG. 4 illustrates transmission functions for hard edge and soft edge parallax barriers;

FIGS. 5 to 15 illustrate various methods of forming soft edge parallax barriers constituting embodiments of the invention.

Like reference numerals refer to like parts throughout the drawings.

DESCRIPTION OF THE PREFERRED EMBODIMENTS

Figure 5:
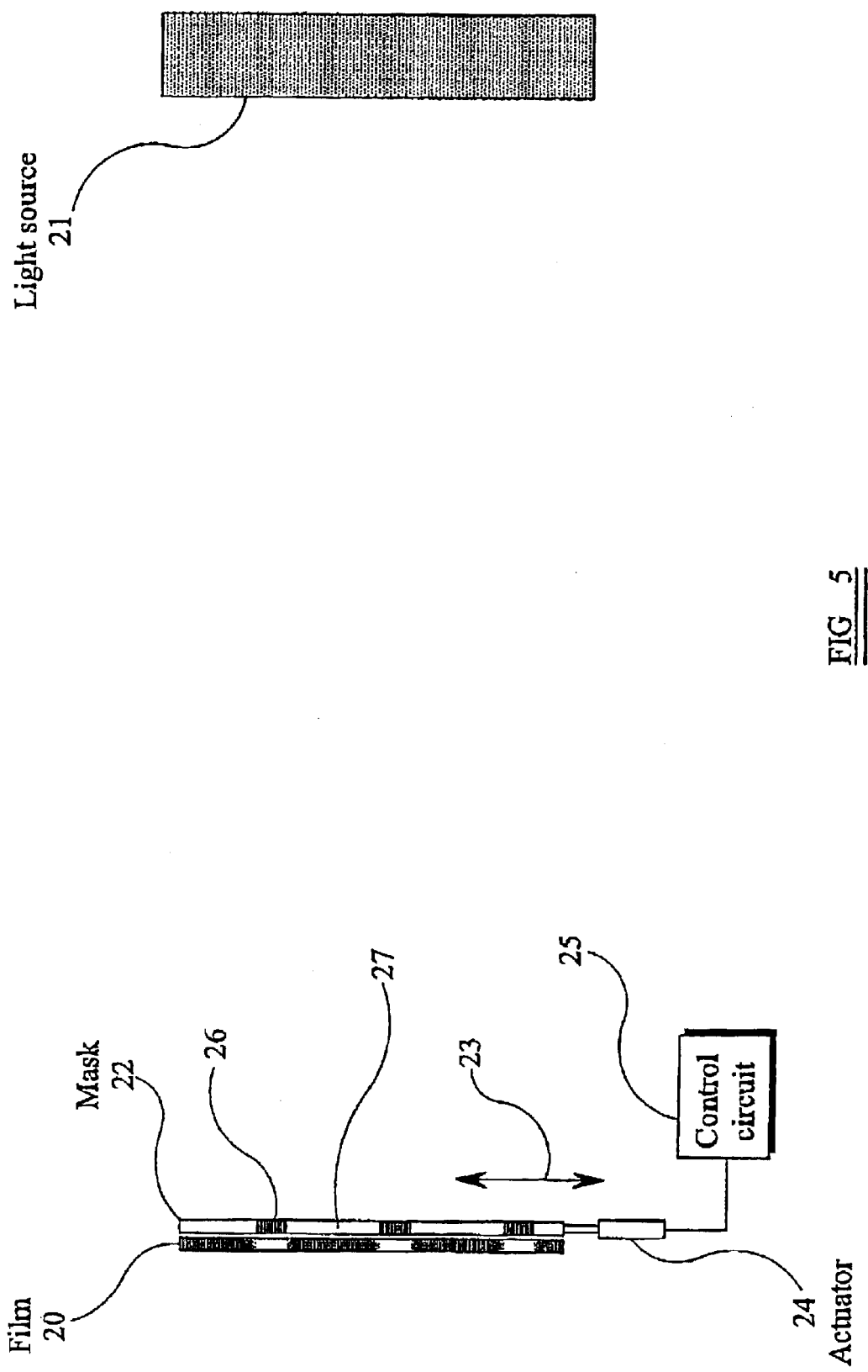

FIG. 5 illustrates a first method of and apparatus for making a soft edge parallax barrier. The barrier is formed on a film 20 comprising a photographic emulsion on a flat substrate. In this embodiment, the film 20 is mounted so as to be stationary relative to a light source 21 for exposing the film. A mask 22 is mounted on a suitable carrier so as to be moveable in a direction indicated by an arrow 23. The mask 22 and the carrier are mechanically connected to an actuator 24, for example of electromagnetic type. The actuator 24 is connected to and controlled by a control circuit 25.

The mask 22 comprises a plurality of elongate parallel opaque regions 26 interlaced with elongate transparent regions 27. The opaque regions 26 are spaced at a pitch substantially equal to the desired pitch of the slits of the finished parallax barrier. The widths of the opaque regions 26 are of the same order as the desired slit width of the parallax barrier. The regions 26 are uniformly opaque whereas the regions 27 are uniformly transparent so that the mask 22 has the appearance of a "negative" of a hard edge barrier. The mask 22 may be made by any suitable technique including those disclosed in the prior art mentioned hereinbefore.

In order to form the parallax barrier, the light source 21, which may produce visible light, ultraviolet light or infrared light according to the exposure needs of the film 20, is switched on and the mask 22 is oscillated or "dithered" backwards and forwards in the direction of the arrow 23. Regions of the film 20 corresponding to the opaque regions in the finished parallax barrier between the slits are continuously exposed to the light produced by the light source 21 through parts of the transparent regions 27 of the mask 22. Conversely, the centre regions of what will become the slits in the finished barrier are completely occluded from the light source 21 by parts of the opaque regions 26. By controlling the movement of the mask 22, parts of the film 20 which will become the slit edges in the finished barrier are partially exposed by the light source 21 as the edges of the opaque regions 26 move backwards and forwards. The control circuit 25 contains a program or the like which controls the movement of the mask 22 so that each part of the film 20 corresponding to the finished barrier slit edges receives a predetermined amount of exposure. The mask 22 may be moved throughout the exposure phase or may be moved only during part of this and then held stationary with the opaque regions 26 being aligned with the centres of the parts of the film 20 which will become the slits in the finished barrier.

When exposure has been completed, the film 20 is removed and developed using any appropriate photographic procedure in accordance with the requirements of the emulsion of the film. The film 20 thus forms a negative image of the mask 22 and comprises parallel evenly spaced soft edge slits separated by opaque regions.

As an alternative in this embodiment and those described hereinafter, the "negative" mask 22 may be replaced by a "positive" mask and the film 20 may be developed using a positive process. The positive mask thus resembles a parallax barrier and an actual hard-edged parallax barrier may be used. A positive image forming a soft-edged barrier is produced by processing the film and this may be used as an actual parallax barrier or in a copying process to produce parallax barriers.

Figure 6:
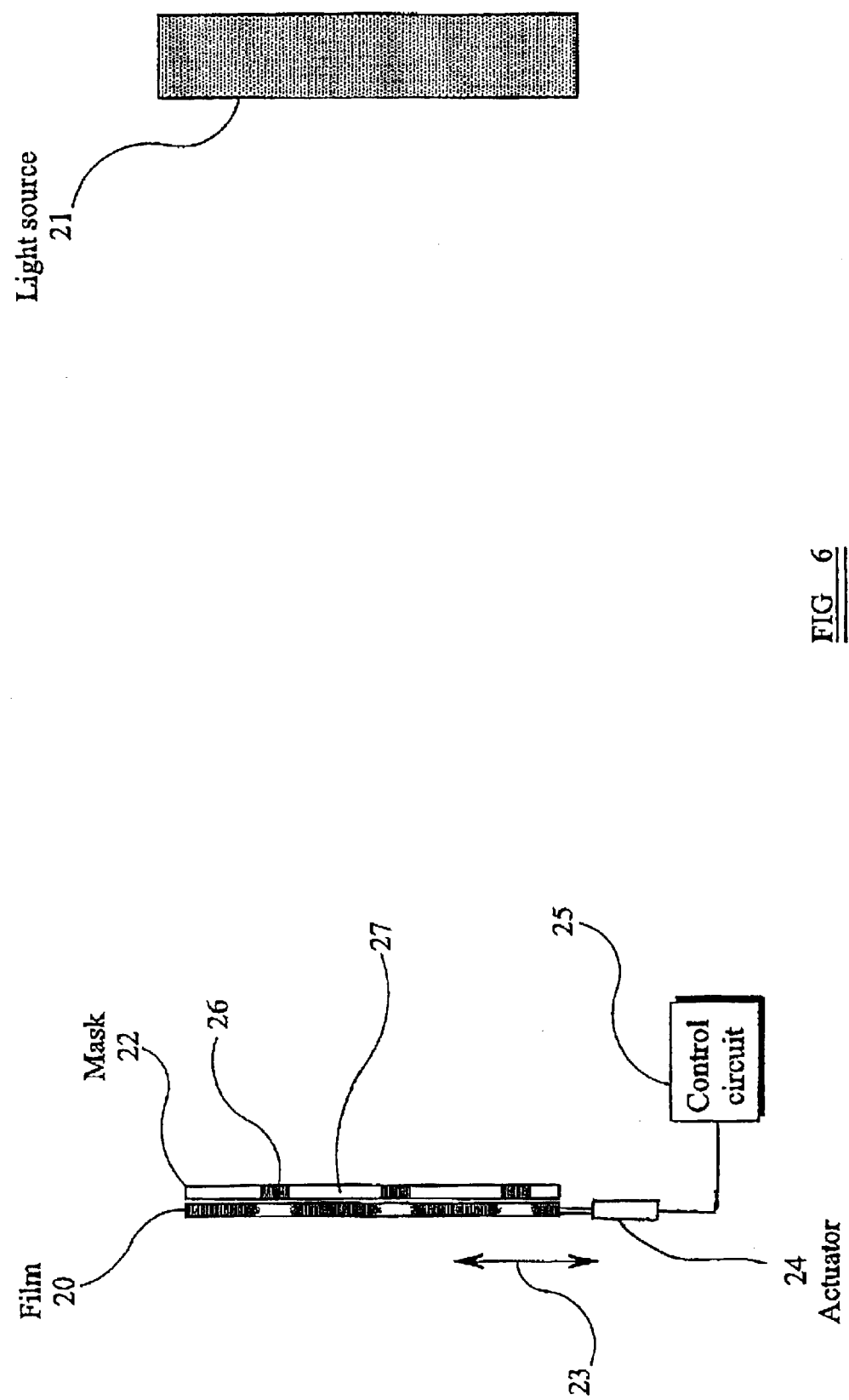

FIG. 6 illustrates an apparatus which differs from that shown in FIG. 5 in that the mask 22 is fixed and stationary with respect to the light source 21 whereas the film in its carrier is dithered in the direction of the arrow 23 by the actuator 24. The dithering movement in both embodiments is parallel to the planes of the film 20 and the mask 22, which are therefore in close proximity to each other. Thus, regions of the film 20 which remain continuously beneath the opaque regions 26 irrespective of the movement of the mask 22 or the film 20 receive no exposure whereas regions which remain continuously behind the transparent regions 27 are arranged to be fully exposed.

Figure 7:
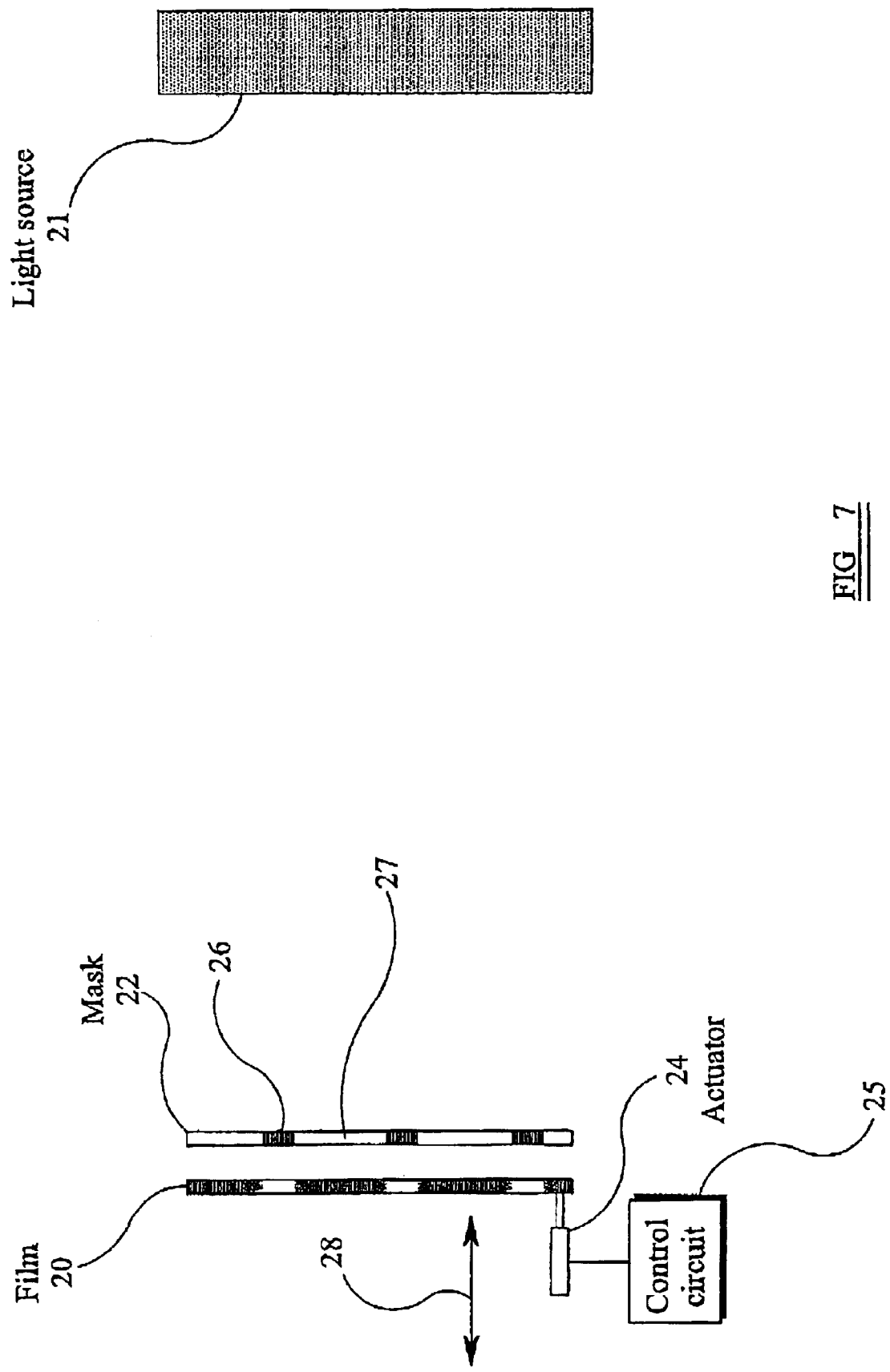

FIG. 7 illustrates an arrangement which differs from that shown in FIG. 6 in that the actuator 24 is arranged to move the film 20 in a direction 28 substantially perpendicular to the plane of the film. The spacing between the film 20 and the mask 22 thus varies and, because the light source 21 is of finite size, the exposure of the parts of the film 20 which form the slit edges in the finished carrier receive a controllable amount of exposure in accordance with the actual movement performed by the film 20.

Figure 8:
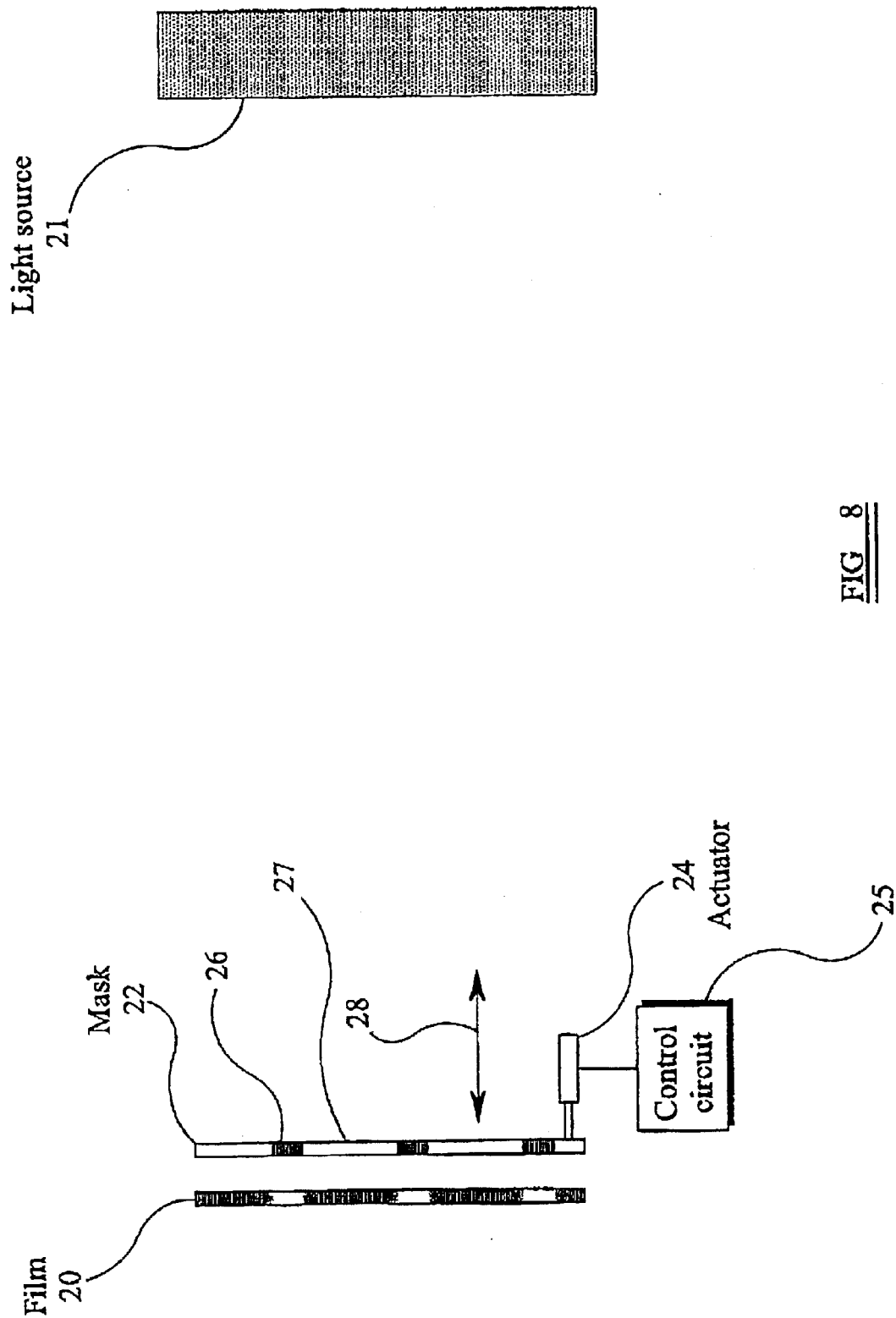

FIG. 8 illustrates an arrangement which differs from that shown in FIG. 7 in that the film 20 is held stationary whereas the mask 22 is moved in the direction of the arrow 28 by the actuator 24.

FIG. 9 illustrates an arrangement which differs from that shown in FIG. 5 in that the film 20 and the mask 22 are stationary and spaced from each other whereas the light source 21 is moved in the direction of the arrow 23 by the actuator 24. Although an extended light source is shown in FIG. 9, a compact light source could also be used in this embodiment.

FIG. 10 illustrates an arrangement which differs from that shown in FIG. 9 in that the light source 21 is dithered in the direction of the arrow 28.

FIG. 11 illustrates an arrangement which differs from that shown in FIG. 9 in that the light source 21 is fixed and is disposed behind a mask 30 which is dithered in the direction of the arrow 23 by the actuator 24. The mask 30 has formed therein an aperture 29 which is of smaller extent than the light source 21. The moving aperture 29 therefore performs the same function as the moving light source of FIG. 9.

FIG. 12 illustrates an arrangement which differs from that shown in FIG. 11 in that the mask 30 is dithered in the direction of the arrow 28.

FIG. 13 illustrates an arrangement which differs from that shown in FIG. 9 in that the light source 21 is mechanically fixed but comprises a plurality of individual lights such as 35 which are individually switched so as to simulate a moving light source. In the upper part of FIG. 13, the upper eight lights are switched on whereas the lower four lights are switch off. The lower part of FIG. 13 shows the upper four lights as being switched off and the lower eight lights as being switched on. In this particular example, the light source 21 is switched alternately between these states so as effectively to perform movement in the direction of the arrow 23. However, the individual lights 35 may be switched as required in order to achieve the desired exposure of the film 20.

Figure 14:
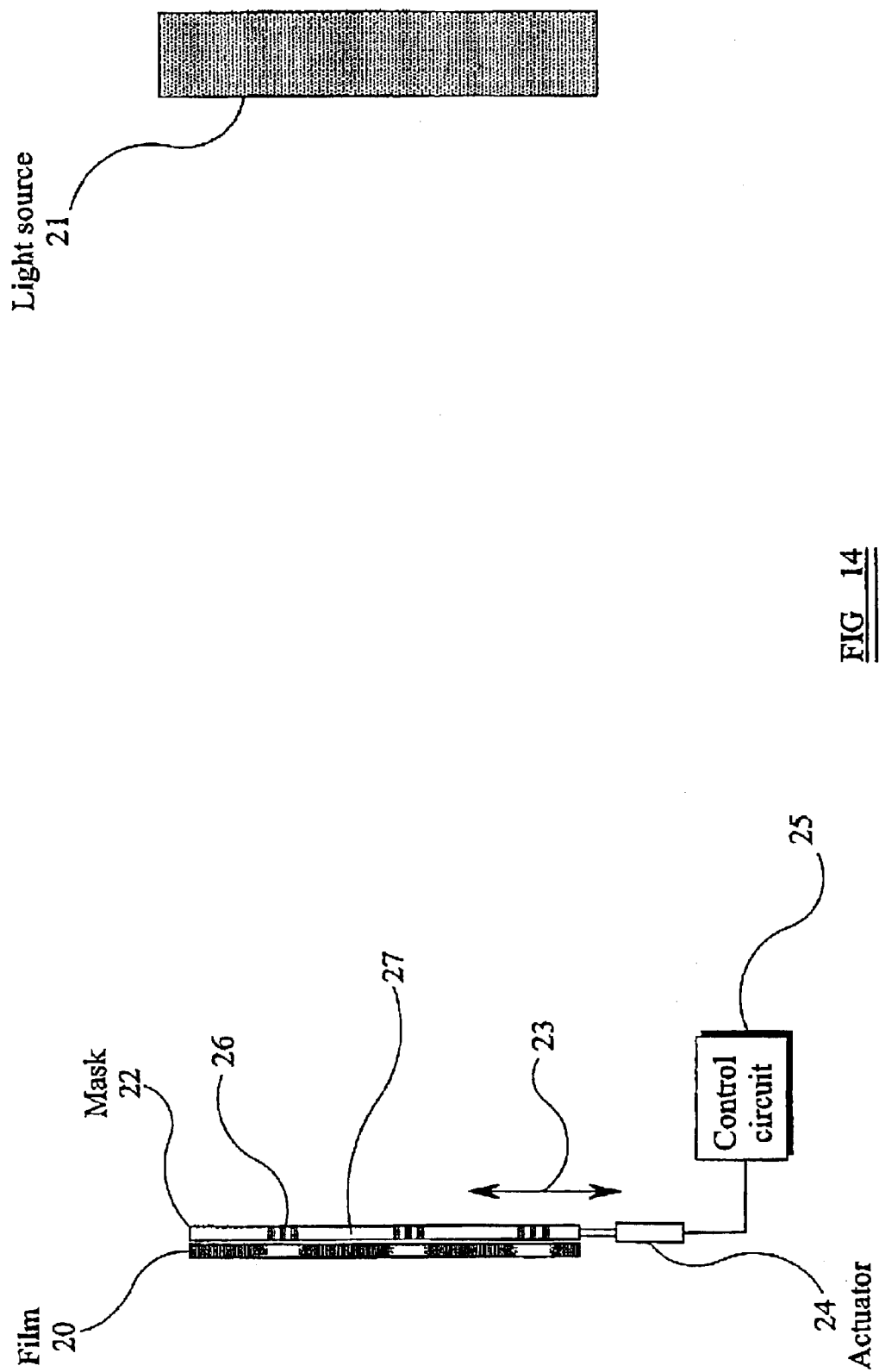

The methods described hereinbefore are suitable for making parallax barriers with "single aperture" slits. However, any of these techniques may be modified so as to form barriers whose slits comprise a plurality of sub-apertures, for example of the types disclosed in EP 1 072 924. By way of example, FIG. 14 illustrates a modification to the arrangement shown in FIG. 5 in that the solid opaque regions 26 are replaced by three opaque regions evenly spaced apart by small transparent regions. The transparent regions between the opaque strips and the transparent regions immediately adjacent the outer edges of the outer opaque strips may be uniformly transparent or may themselves have soft edges. A sub-aperture is formed between each opaque strip so that the arrangement illustrated in FIG. 14 would produce a parallax barrier whose slits have three sub-apertures.

FIG. 15 illustrates another technique for providing multiple sub-aperture barriers. In this case, a plurality of light sources is used and FIG. 15 illustrates the arrangement of FIG. 5 modified to comprise three light sources 21a, 21b and 21c. The light sources thus throw three shadows of the opaque regions 26 of the mask 22 to form the sub-apertures. However, this results in some exposure of the parts of the film 20 which form the slits in the finished barrier. The photographic emulsion on the film 20 may therefore be selected so that its characteristics result in the partially exposed regions corresponding to any fully transparent slit regions in the finished barrier not being substantially affected by the limited exposure which they receive.

The arrangement illustrated in FIG. 13 may also be modified to form a plurality of sources by appropriately controlling the individual lights.

Figure 1:
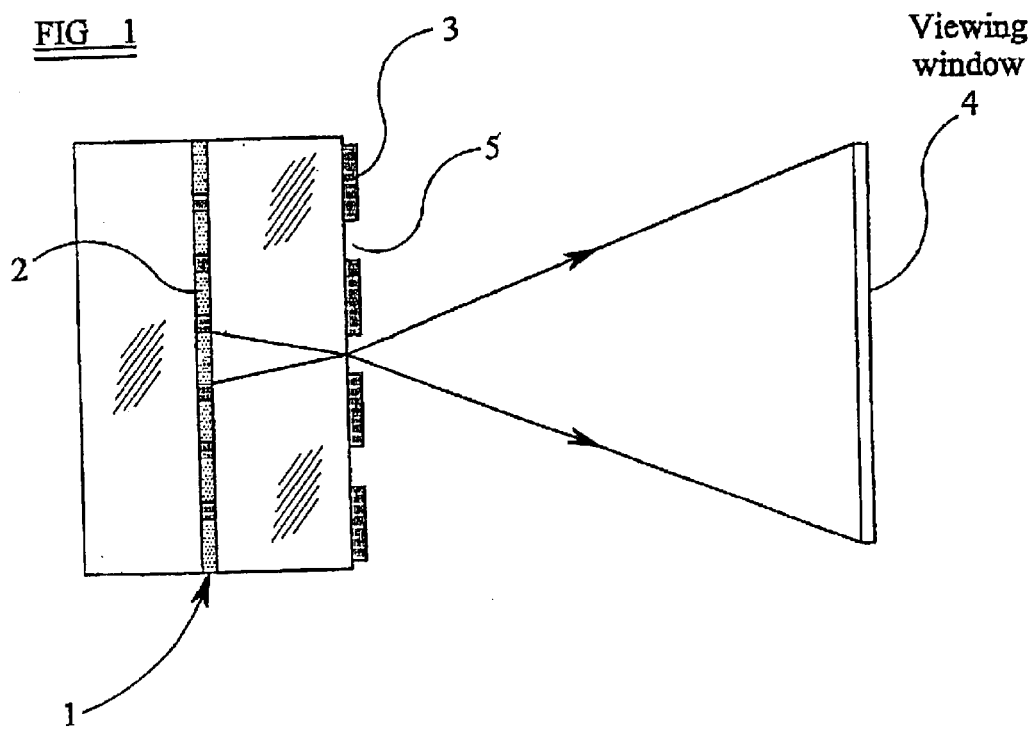
FIG. 1 is a horizontal cross sectional diagrammatic view of a known type of front parallax barrier autostereoscopic 3D display.
Figure 2:
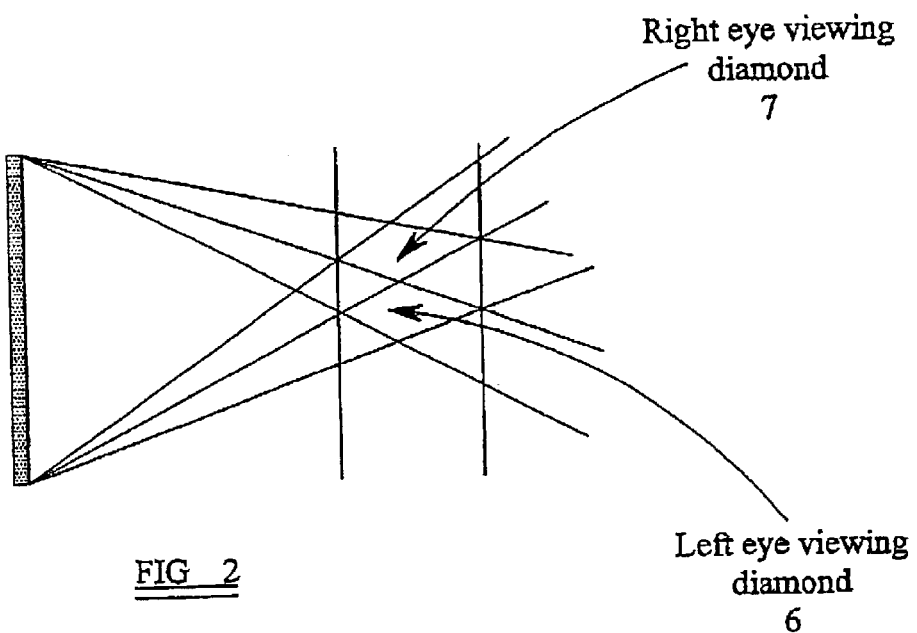
FIG. 2 is a diagrammatic plan view illustrating the formation of viewing windows.
Figure 16:
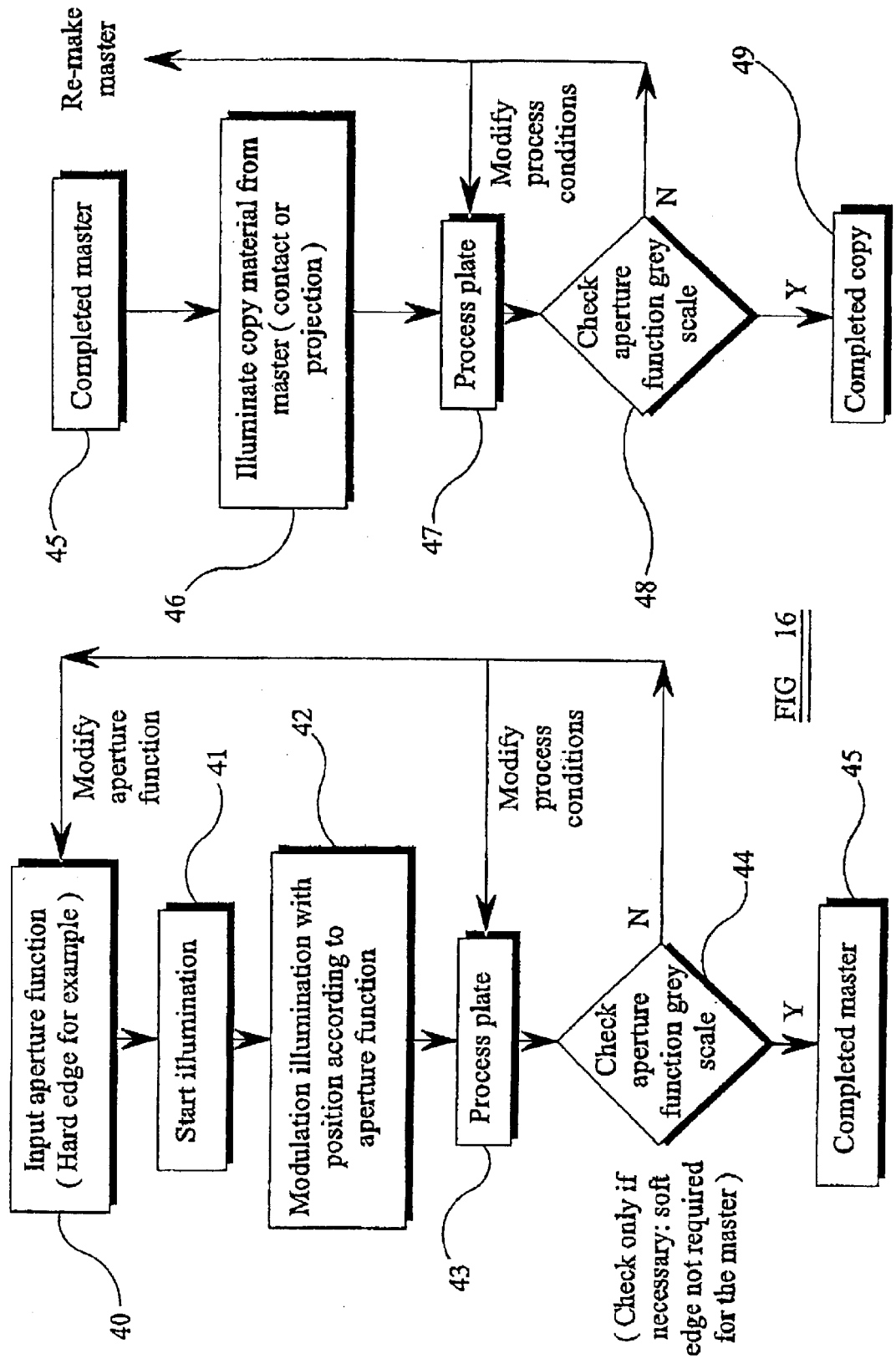
FIG. 16 is a flow diagram illustrating a procedure for creating a contact copy of a soft edge parallax barrier.

The techniques described hereinbefore may be used to make finished parallax barriers for use as optical elements in any suitable application. Such barriers may be used in autostereoscopic 3D displays, for example of the front barrier type as shown in FIG. 1 or of the rear barrier type. Alternatively, if more appropriate or convenient, the barriers made by the techniques described hereinbefore may be used as "masters" in a subsequent copying process. An example of a copying process is illustrated in FIG. 16.

At 40, an input aperture function, for example of the hard edge type, is defined and a step 41 forms a hard edge mask. A step 42 may be performed if the mask is required to have soft edges. A plate carrying a photographic emulsion exposed in the step 41 for forming the mask is processed at 43, after which the resulting aperture function grey scale may optionally be checked at 44 and, if not as required, the steps 40 to 43 may be repeated with a modified aperture function and/or with modified process conditions. Once the check 44 is satisfactory, the completed master is provided at 45. The step 42 is performed using any of the techniques illustrated in FIGS. 5 to 15.

The master 45 is then used in the copying process illustrated by the steps 46 to 48. In particular, copy material is illuminated using the completed master, for example by contact or projection copying, in the step 46 and the exposed copy material is processed at 47. The aperture function grey scale is checked at 48 and, if acceptable, the completed copy is supplied at 49. If the check is unsatisfactory, the process conditions in the step 47 may be modified and/or the master may be remade by returning to the steps 40 to 44.

What is claimed is:

1. A method of making a parallax barrier, comprising the steps of:

providing a first mask having a plurality of elongate opaque regions with longitudinal axes, said opaque regions being interleaved, in a first direction perpendicular to said longitudinal axes of said opaque regions, with a plurality of transparent regions;

exposing, during an exposure period, a photographic material to light from a light source through said first mask while, during at least part of said exposure period, moving at least one of said first mask, said material and said light source relative to at least one other of said first mask, said material and said light source so as to vary an exposure of each region of said material for forming a slit edge of said parallax barrier; and developing said exposed material to form said parallax barrier.

2. A method as claimed in claim 1, in which said relative movement is in a direction parallel to said first direction.

3. A method as claimed in claim 1, in which said relative movement is in a direction perpendicular to said first direction and to said longitudinal axes of said opaque regions.

4. A method as claimed in claim 1, in which said first mask is moved relative to said material.

5. A method as claimed in claim 1, in which said first mask is spaced from said material and said light source is moved relative to said first mask.

6. A method as claimed in claim 1, in which said light source comprises a light emitter disposed behind a second mask defining an aperture.

7. A method as claimed in claim 5, in which said light source comprises a light emitter disposed behind a second mask defining an aperture and said second mask is moved relative to said first mask.

8. A method as claimed in claim 6, in which said light source comprises a plurality of light emitters which are switched so as to vary the direction of illumination of said material.

9. A method as claimed in claim 1, in which said light source comprises a plurality of light sources.

10. A method as claimed in claim 1, in which said opaque regions are substantially uniformly opaque.

11. A method as claimed in claim 1, in which said transparent regions are substantially uniformly transparent.

12. A method as claimed in claim 1, in which said transparent regions have edges whose transmissivity varies in said first direction.

13. A method as claimed in claim 1, in which said mask comprises a plurality of groups, each of which comprises a plurality of at least one of said opaque and transparent regions for forming a parallax barrier slit having a plurality of sub-apertures.

14. A method as claimed in claim 1, in which said material comprises a photographic emulsion on a substrate.

15. A method as claimed in claim 1, in which said material is arranged to darken as a result of said exposing step.

16. A method as claimed in claim 1, comprising using said parallax barrier in a copying process to make further parallax barriers.

17. A parallax barrier made by a method providing a first mask having a plurality of elongate opaque regions with longitudinal axes, said opaque regions being interleaved, in a first direction perpendicular to said longitudinal axes of said opaque regions, with a plurality of transparent regions;

exposing, during an exposure period, a photographic material to light from a light source through said first mask while, during at least part of said exposure period, moving at least one of said first mask, said material and said light source relative to at least one other of said first mask, said material and said light source so as to vary an exposure of each region of said material for forming a slit edge of said parallax barrier; and developing said exposed material to form said parallax barrier.

18. An autostereoscopic three dimensional display comprising a parallax barrier made by a method providing a first mask having a plurality of elongate opaque regions with longitudinal axes, said opaque regions being interleaved, in a first direction perpendicular to said longitudinal axes of said opaque regions, with a plurality of transparent regions;

exposing, during an exposure period, a photographic material to light from a light source through said first mask while, during at least part of said exposure period, moving at least one of said first mask, said material and said light source relative to at least one other of said first mask, said material and said light source so as to vary an exposure of each region of said material for forming a slit edge of said parallax barrier; and developing said exposed material to form said parallax barrier.

* * * * *